US007446279B2

(12) United States Patent
Paradise

(10) Patent No.: US 7,446,279 B2
(45) Date of Patent: Nov. 4, 2008

(54) LOG SPLITTER

(76) Inventor: Anthony Paradise, 77 Fern Ave., Litchfield, CT (US) 06759

(*) Notice: Subject to any disclaimer, the term of this patent is extended or adjusted under 35 U.S.C. 154(b) by 0 days.

(21) Appl. No.: 11/365,785

(22) Filed: Feb. 28, 2006

(65) Prior Publication Data

US 2007/0000975 A1 Jan. 4, 2007

Related U.S. Application Data

(62) Division of application No. 11/172,221, filed on Jun. 29, 2005, now Pat. No. 7,334,615.

(51) Int. Cl.
*B23K 9/007* (2006.01)
*B23K 9/04* (2006.01)

(52) U.S. Cl. ........................................ 219/86.9; 219/87

(58) Field of Classification Search ................. 228/182; 144/193.1, 195.1; 219/86.1, 86.21, 86.9, 219/87

See application file for complete search history.

(56) References Cited

U.S. PATENT DOCUMENTS

| | | | | |
|---|---|---|---|---|
| 3,243,569 | A * | 3/1966 | Petry | 219/74 |
| 4,239,070 | A * | 12/1980 | Burns | 144/195.1 |
| 4,461,331 | A * | 7/1984 | Mertz | 144/195.1 |
| 5,337,810 | A * | 8/1994 | McCormack | 144/195.1 |
| 6,689,982 | B2 * | 2/2004 | Gabbianelli et al. | 219/118 |
| 7,334,615 | B2 * | 2/2008 | Paradise | 144/193.2 |
| 2005/0279423 | A1 * | 12/2005 | Albright | 144/193.1 |

* cited by examiner

*Primary Examiner*—Kevin P Kerns
(74) *Attorney, Agent, or Firm*—Michaud-Duffy Group LLP

(57) ABSTRACT

A self-contained, or externally actuated, hydraulic log splitter which includes a frame on which is slidably mounted an assembly of a specially designed push plate secured at one end to a reversible hydraulic cylinder and at the other to a splitting table carrying logs which is pushed against a straight blade to split the logs. A plurality of lines of discrete nubs are integrally a part of the push plate along a majority of its entire height and positioned substantially parallel to the straight blade and spaced away from the edge of the push plate. These nubs to provide specialized and improved gripping of log segments as they are split thereby minimizing the tendency of the split log segments to fly away from the splitter. An electric or gas engine driving an hydraulic pump or the hydraulic system of a tractor is connected to drive the reversible hydraulic cylinder.

12 Claims, 3 Drawing Sheets

LOG SPLITTER

CROSS-REFERENCE TO RELATED APPLICATIONS

This patent application is a divisional application of and claims the benefit under 35 U.S.C. 120 of U.S. patent application Ser. No. 11/172,221, filed Jun. 29, 2005, now U.S. Pat. No. 7,334,615, issued Feb. 26, 2008.

FIELD OF THE INVENTION

This invention relates generally to a splitting machine for splitting logs.

BACKGROUND OF THE INVENTION

Log splitters are in common use that support a log between a ram and a wedge shaped splitting blade and where a ram with a push plate engages one end of the log and moves the log into forceful engagement with the sharp edge of the splitting blade and continues the movement of the log relative to the blade to effect a splitting of the log. In such log splitters the sharp edge of the blade penetrates the end of the log and as the log continues to move relative to the blade the side surfaces of the wedge will force the log to split. During the splitting process the log is held in place by the tension created by the force of the push plate against the log end. If that tension holding the log in place against the push plate is exceeded by the force vector directed outward exerted by the ram, the log will slip unpredictably laterally or vertically across the push plate face and may actually be ejected unexpectedly outwardly from the desired position at the center of the push plate. This unexpected slippage and ejection of the log from the machine can impact the operator or a bystander, potentially causing injury.

Various designs of modification to a flat push plate are known including a chevron pattern shown in U.S. Pat. No. 4,239,070. A diagonally oriented pattern of ridges is disclosed in U.S. Pat. No. 4,103,724. Some designs include raised edges on the perimeter of the push plate as in U.S. Pat. No. 4,470,441. Some disclose protrusions or spikes on the plate such as in U.S. Pat. No. 4,487,239 and Swiss Patent No. CH 617384.

Despite all these attempts to stabilize the logs during splitting there remains a need for a durable and practical solution that prevents unwanted slippage and ejection of the log. Based on the foregoing, it is the general object of the present invention to provide a log splitter with a push plate design that minimizes or eliminates the unpredictable ejection of logs being split It is also an object of the invention to provide a log splitter that overcomes or improves upon the problems and drawbacks associated with existing log splitter push plates.

SUMMARY OF THE INVENTION

The present invention is directed to a log splitter that includes a frame and a splitting blade fixed vertically at one end of the frame. A table member is translationally supported on the frame and is adapted to support a log thereon. The table member has a push plate fixed thereto and adapted to push one end of the log so as to cause the opposite and to engage the splitting blade. Power transfer means are operatively connected to the push plate to reciprocally move the push plate to force the log through the splitting blade. The push plate includes a plurality of rows of individual nubs protruding from the face of the push plate for contacting the log. The rows of individual nubs being substantially parallel to and spaced substantially perpendicularly away from a splitting edge defined by the splitting blade.

BRIEF DESCRIPTION OF THE DRAWINGS

In the accompanying drawing, in which is shown one of the various possible illustrative embodiments of this invention, wherein like reference characters identify the same or like parts.

DETAILED DESCRIPTION OF THE PREFERRED EMBODIMENTS

Figure 1:
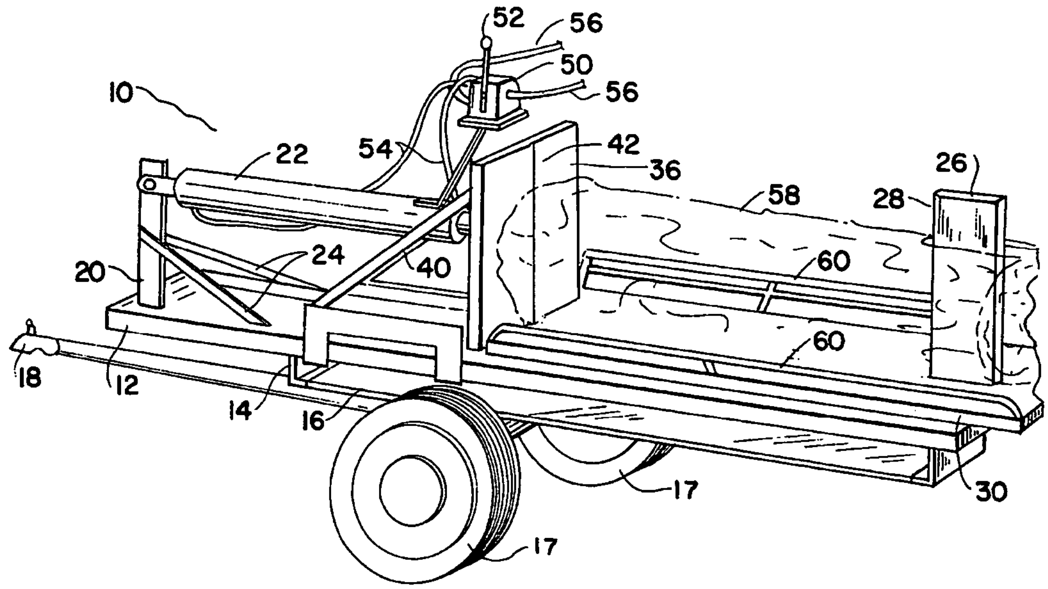
FIG. 1 is a perspective view of an embodiment of the invention.
Figure 2:
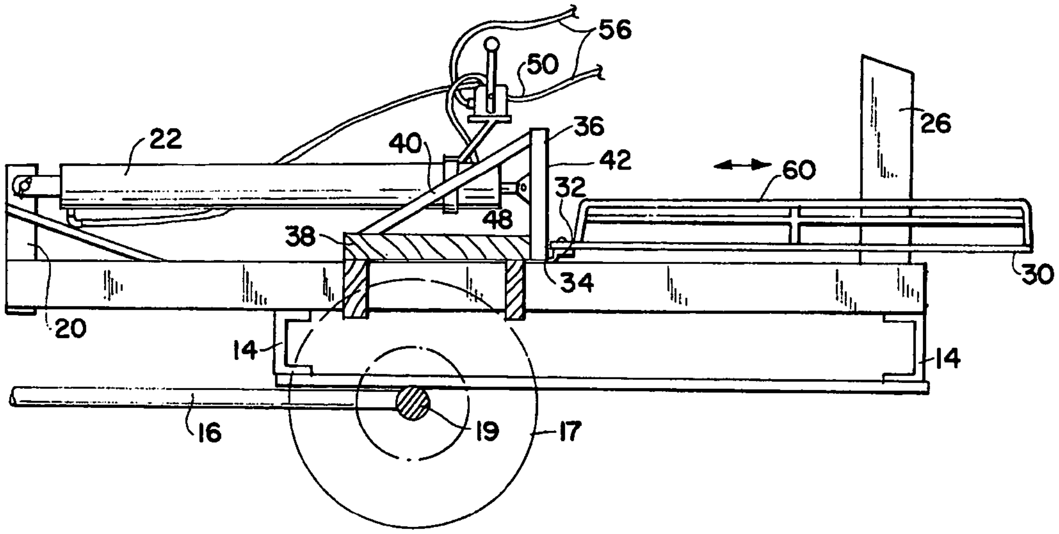
FIG. 2 is a side view thereof.

With reference to the drawing, there is shown and illustrated a log splitter constructed in accordance with the principles of the invention and designated generally by reference character 10.

The log splitter 10 includes a frame 12 and sub-frame assembly 16, secured to the frame by members 14, to an axle 19 having wheels 17 mounted thereon and fixed. A hitch 18 for a trailer mount is secured to the sub-frame assembly 16.

A bracket 20 is welded or otherwise fixed to one end of the frame 12 and supports one end of a hydraulic cylinder 22. Braces 24 are welded to a bracket 20 and to the frame 12.

A vertical splitting blade 26 is mounted to the other end of the frame 12. The splitting blade 26 has a generally wedge shaped splitting edge 28. The splitting blade 26 can take many suitable shapes as is well known in the art. The splitting edge 28 is oriented vertically and its line of travel takes it during the splitting stroke to a centerline 42 which is the imaginary projected intersection line of the splitting edge which is optimally near the midline of a push plate 36.

Figure 3:
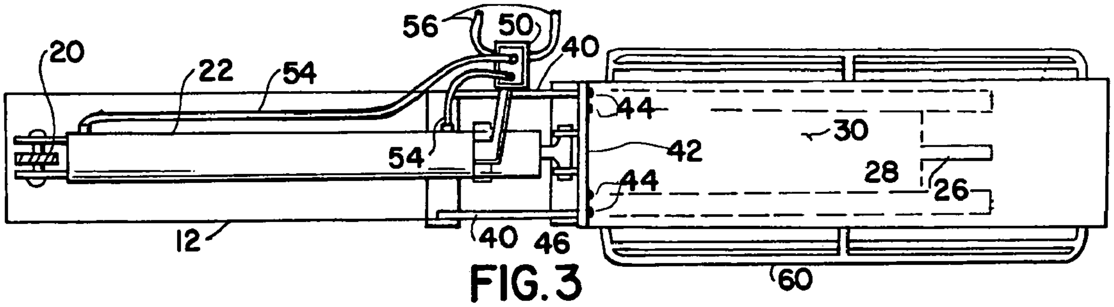
FIG. 3 is a partial top plan view of selected component s from FIGS. 1-2 showing the table mechanism.
Figure 4:
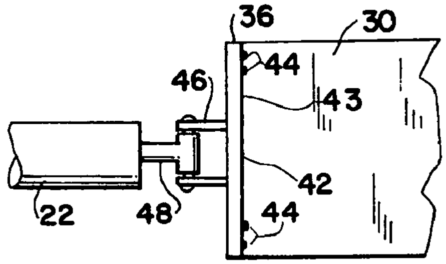
FIG. 4 is a detailed plan view showing the push plate with two rows of nubs.

As shown in greater detail in FIGS. 3 and 4, the splitting blade 26 is mounted on the frame 12 relative to a moving table member 30 that consists of a structural metal plate. The table member 30 is secured by bolts 32 and plates 34 on each side of the push plate 36 that is in turn secured to one end of a slide assembly 38 movable on the frame 12. Slide assembly 38 has braces 40 fixed thereto and to the push plate 36 for reinforcement.

On a blade engagement side 43 of the push plate 36 two rows of nubs 44 project outwardly from the push plate, one row located on each side of the centerline 42 shown best in FIG. 4 where it shows that the lines of nubs 44 are positioned vertically and spaced away from the centerline 42, leaving the center area of log engagement free of nubs. It has been found that the lines of nubs 44 should optimally be positioned such that the outer ½ of the circumference of a log 58 engages the nubs.

Figure 5:
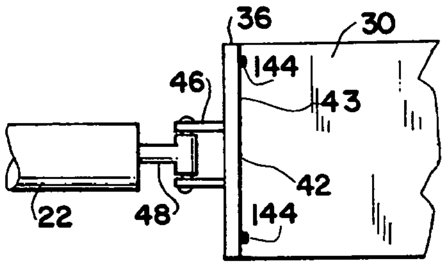
FIG. 5 is a detailed plan view of a push plate with a single vertical row of nubs.
Figure 6:
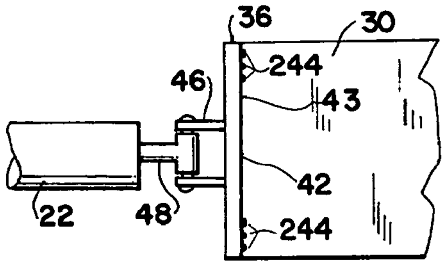
FIG. 6 is a detailed plan view of a push plate having three substantially parallel rows of nubs

FIG. 5 illustrates an alternate embodiment in which there is only a single row of nubs 144. FIG. 6 shows another embodiment where there are three substantially parallel rows of nubs 244.

Figure 7:
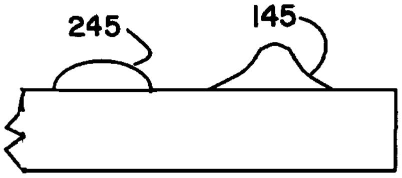
FIG. 7 is an enlarged partial side view of the push plate showing the nubs having hemispheric and conical shapes.

The shape of each nub is important. FIG. 7 illustrates an enlargement of a single nub 245 that shows that the nub has a generally rounded profile above the plane of the push plate 36. The single nub 245 has a generally conical shape with a rounded peak at the top. Each nub 145, 254 is discrete and separate from other nubs around them with sufficient space between successive numbs to prevent log debris from to be compacted, compressed and trapped between adjacent nubs in the vertical line of nubs 44, 144, 244.

Preferably the nubs will have a space between adjacent vertically aligned nubs of between about 0.5 to 3 nub diameters. More preferably, between 0.75 and 2.5 diameters between nubs. Most preferably between 1 and 2 diameters between nubs.

The diameter or base of the nub can vary depending on the profile of the nubs and method of manufacture. Preferably it can be from about 1 cm to about 3 cm, more preferably from about 1.5 cm to 2.5 cm and most preferably between about 1.75 to about 2 cm. Log splitters designed to handle larger logs will be bigger than the foregoing and smaller splitters may be smaller. It is within the skill in the art to select the optimum size range.

The vertical rows of nubs should preferably be positioned closer to the outer edge of the push plate than to the centerline 42, shown in FIG. 1 where the blade leading edge 28 would touch the push plate if the stroke allowed it to do so. It has been found that the lines of nubs 44, 144, and 244 should more preferably be positioned to engage the log about halfway from the logs centerline to the outer extent of its perimeter. More preferably the rows of nubs are spaced from the centerline at a distance more than one half the transverse distance from the centerline to the outer edge of the push plate. The rows of nubs should be substantially parallel to the centerline to grip the logs.

Nubs 45, 145 and 245 will preferably take the general form of a slightly flattened hemisphere varying toward a cone shape. The vertical cross sectional shape of the nub 45 accordingly will vary but will generally fall between a generally triangular shape and a slightly flattened semicircle. The aspect ratio (base : height) of the cone or flattened hemisphere generally will be greater than 1:1. This aspect ratio may preferably range from 1:1 to 4:1, more preferably 1.5:1 to 3:1 and most preferably 1.5:1 to 2:1.

The horizontal cross-section of nub 45 preferably circular but may also be oval, oblong, triangular, rectangular, square, parallelogram or rhombus shaped. The circular, oval or oblong is preferred, circular and oval more preferred and circular most preferred as illustrated in FIG. 7 where nub 145 is shown.

This characteristic of the nubs to take the form of a discrete, generally hemispheric to conical shaped protrusion from the push plate surface has been found to be closely related to the ability of the nubs to optimally function by affirmatively gripping the log 58 engaging end surface but not being susceptible to accumulation of debris. Such accumulation of debris is why most other push plate designs become clogged with debris and thereby loose their gripping ability during prolonged use of the log splitter.

It is preferred that there be irregularity to the nub upper surface. That irregularity should not be in the nature of spikes or angular or v-shaped grooves because spikes will break off during use and angular or v-shaped grooves will fill with debris. A random network of low profile ridges, swirls and rounded depressions is most preferred. These swirls and ridges will be characterized by multiple irregular grooves that when viewed in a cross-section perpendicular to the direction of the groove will generally have width-to-depth ratios of greater than 2:1 and preferably 3:1. This assures that debris will not accumulate in the grooves but the upper surfaces of the grooves will grip the logs firmly to prevent slippage.

A preferred method of making the nubs lends itself to the ideal random surface topology characteristics of the nubs. That method is to spot weld dots comprised of a build up of welding material deposited upon the surface of the push plate to form each nub in the vertical line or lines desired. The weld formed nubs are integral with the push plate surface and thus durable. The desired welding technique is to slightly vary the deposition of welding material for each of the dots to create essentially randomized external patterns of deposition. These patterns preferably include a variety of circumferential grooves along with smooth folds, depressions, protrusions and swirl pattern flows on the outer surface of each nub. Manual handling of the welding rod gives a particularly useful topology or texture to the upper surface of the nub that is essentially random, non-directional topology of grooves and protrusions to the nub. The individual nubs made by this preferred method may have a variety of topologies including some nubs being more conical in form than adjacent nubs that have more generally hemispheric shapes. This slight variation has been found to be advantageous in distributing pressure more effectively. The variation also allows for irregularities in the logs cut surface that is in contact with the push plate. It also can grip more effectively if a portion of the log is not as solid as other parts of the log's end. The more conical nubs grip the softer wood while the more hemispheric shaped nubs hold the solid, harder portions of the log with substantially higher surface tension. The slight irregularities of the spot weld formed nubs is very advantageous to gripping without being subject to collecting compacted wood debris during long periods of use or wet conditions.

An automated welding process could also be utilized effectively by forming each spot welded nub in uniform predetermined shape more preferably between a rough surfaced flattened hemispheric shape and a very low profile conical or pyramidal shape. As previously described other base perimeter shapes could also be utilized in this automated welding manufacturing operation including some more straight sided low profile shapes so long as there are few sharp angular edges which would catch and hold debris and soon become clogged and ineffective.

The welding build-up method of applying nubs to the push plate is a unique method of making the push plate subassembly for a log splitter. This unique method of making the push plate can be used for original equipment manufacturing or used as replacement push plate or retrofitting of most existing designs of log splitters.

Another advantage of the welding manufacturing method for applying the nubs is that it makes the nubs an integral part of the push plate, thereby imparting durability to the structure. This is a very economical manufacturing method.

Other methods may include applying rivets through the push plate where the rivets have the previously described desired head configurations. In this embodiment the rivet head protrudes above the push plate log-engaging surface as a nub. It may also be possible to insert bolts through predrilled holes in the push plate so long as the bolt head has the desired random non-directional topology.

There should be at least six nubs in an individual vertical line and as many additional nubs as can practically fit vertically on the push plate. A nub line consisting of 2, 3 or 4 nubs would not have the requisite holding power on the logs during splitting operations. In typical manually operated splitters, each line would have between about 6 and 14 nubs in each vertical line, more preferred would be between 8 and 12 and most preferred would be 10 to 12. These ranges would vary upward and downward with the size of the push plate and ultimately with the size of the logs 58 the splitter is designed to accommodate. The foregoing is for smaller splitter units designed for individuals and small commercial units. Larger units used in logging would typically have larger push plates and therefore more nubs in the vertical lines of nubs.

The problem being addressed during the development of the parallel vertical lines of nubs was the one of having the log or a log segment shoot with great force out the side or top of the splitter unit. These ejected logs or split segments are a hazard to the operator and any bystanders since they eject at high velocity and with great inertial energy. It is a longstanding objective in this field to minimize these occurrences.

The log splitter of FIGS. 1-4 was compared to a unit fitted with smooth push plates and it was found to hold the logs in place much better. The types of push plates that have diagonal or directional grooves or traction bars such as the one disclosed in U.S. Pat. No. 4,103,724 to make the problem of ejection worse by directing the log ejection in a particular direction. By contrast the log splitter of this invention with its non-directional lines of nubs held the logs better than a push plate with directional or diagonal protrusions.

The attachment of protruding edges on the outer perimeter of the push plate such as the design shown in U.S. Pat. No. 4,470,441 suffers from two problems. One is that the edges are easily torn off by the very large force vectors encountered during splitting operations. No matter how they are attached, whether welded or bolted, the shearing forces encountered during operations from slipping logs will tear those protruding edges off. Secondly, the force of ejection of logs from such push plates is greater when it does occur because the slipping log is held by the protruding edge temporarily while the force builds even higher and finally the displaced log slips over the angle iron or welded protruding edge at an even higher ejection velocity and momentum than if that edge were not there to temporarily restrain the displaced log. This is a greater hazard to the operator.

The log splitters that have sharp protrusions or spikes on the plate such as U.S. Pat. No. 4,487,239 or Swiss Patent No. CH 617384 suffer from two drawbacks. Firstly, the sharp spikes break off due to the high shearing forces encountered during prolonged surface. Secondly debris builds up on and between the sharp spikes or protrusions. This build-up of debris reduces the holding efficiency progressively during prolonged use and makes for inconsistent holding ability thereby introducing variability in operation, an undesirable feature of any repetitive operation.

A fork 46 is secured to push plate 36 and is connected to the end of rod 48 of reversible hydraulic cylinder 22.

A hydraulic control valve 50, actuated by push-pull control rod 52, is connected via hoses 54 to cylinder 22. Hoses 56 connect valve 50 to any suitable fluid drive (not shown) which can be mounted on the subframe in the form of a gasoline motor and a fluid drive assembly as described in relation to the embodiment of FIG. 8. The fluid drive could also be mounted on an external devise such as a tractor or be a free standing hydraulic pump with any type of power source, internal combustion engine or electric motor driven. Valve 50 is of the positive type in that it allows fluid to pass only when the operator actuates the push-pull rod, to apply and remove hydraulic pressure. The movement of the cylinder pushing the push plate and hence logs 58 against blade 26 can be very slow making the machine safe to use. A typical splitting cycle is 10 to 12 seconds.

Retaining sides 60 made of ½ inch steel rods are mounted at an angle to table 30. As a result of this arrangement, once a log is placed on table 30, it can stay there during one or several splitting cycles. Accordingly, logs can be put through the blade several times with no split logs falling to the ground. Also noteworthy is the fact that the smaller logs, 2 or 3, can be stacked to go through with one stoke of the push plate. Advantageously, the split logs all remain on table 30 behind the blade when the push plate has reached its full travel so they can be removed in one neat bundle. These retaining sides are optional and in a common simpler configuration the retaining sides are not present.

Figure 8:
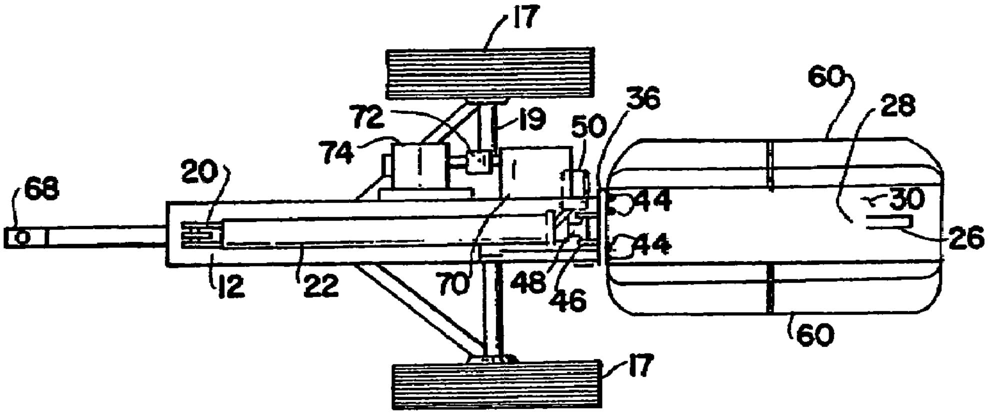
FIG. 8 is a top plan view of an embodiment of the invention including an attached motor and hydraulic pump mounted on the splitter frame.

FIG. 8 shows a self-contained version of the splitter of the invention which differs from the previous embodiment by being mounted on hitch frame 68; by having oil tank 70 connected to hydraulic pump 72 and has gas engine 74 operatively associated with pump 72. Control valve 50 regulates flow of hydraulic fluid from the pump 72 to hydraulic cylinder 22. The assembly can be attached to a truck or snowmobile and can be operated without unhooking it from the towing vehicle. Additionally, by attaching the assembly to the tractor drawbar, the splitter can be raised to the proper height above the ground so that the operator does not have to work stooped over.

Figure 9:
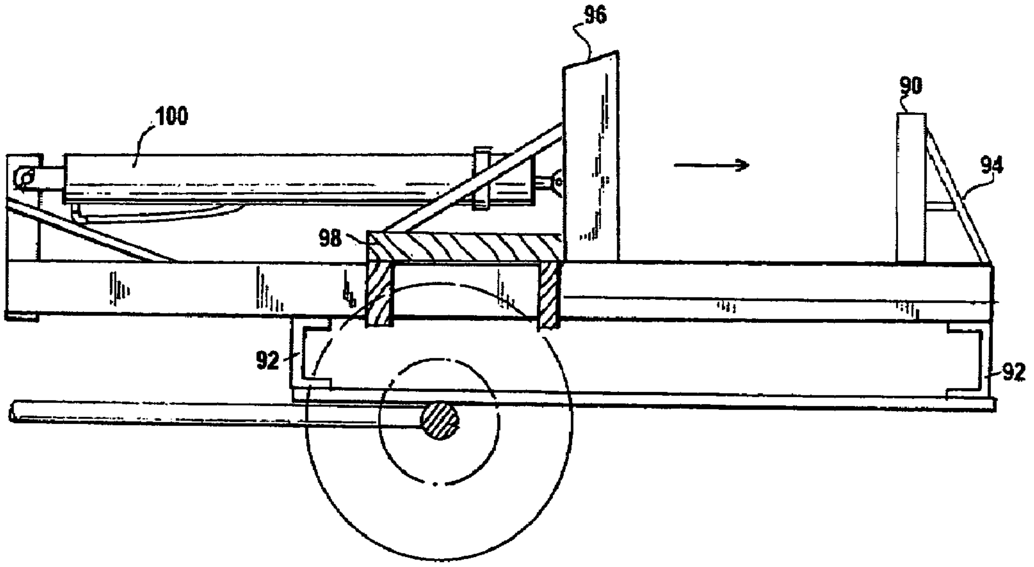
FIG. 9 is a side view of an embodiment of the invention with the push plate fixed and blade moveable.

FIG. 9 shows an alternate splitter embodiment where the push plate 90 is fixed on the frame members 92 and supported by reinforcement members 94 and the splitting blade 96 is moveable relative to the fixed push plate 90. The splitting blade travels toward the push plate 90, carried on slide assembly 98 driven by the hydraulic cylinder 100. After the spitting operation is completed, the direction of travel is reversed to prepare for the next cycle. The push plate 90 in this embodiment has all the characteristics set out in FIGS. 4 through 7 regarding the nubs. This embodiment where the splitting blade 96 is moveable relative to the push plate 90 is not widely used but such a configuration can benefit from the special properties of this invention.

A typical model of the present splitter equipped with a hydraulic system with a 13 G.P.M. hydraulic pump can split 4 logs per minute.

The push plate can be made of any metal or reinforced plastic or composite material that has the requisite torsional strength to resist bending or distorting in any direction during the splitting cycle. The hydraulic devices described herein could be replaced with electromechanical translational devices or even pneumatic systems so long as those systems can deliver the required force on the push plate to split the logs on the blade. These elements of the description as set forth in the preferred embodiments are currently the most common and economical devices for log splitters of the described type.

The operation and use of the invention hereinabove described will be evident to those skilled in the art to which it relates from a consideration of the foregoing.

As various possible embodiments might be made of the above invention, and as various changes might be made in the embodiments above set forth, it is to be understood that all matter herein set forth or shown in the accompanying drawing is to be interpreted as illustrative and not in a limiting sense.

What is claimed is:

1. A method of manufacturing a push plate subassembly for a log splitter apparatus comprising welding a plurality of nubs of welding rod material to a metal plate having a vertical centerline and outer edges, said plurality of nubs being positioned on both sides of the centerline in a plurality of lines substantially parallel to the vertical centerline of said metal plate and closer to the outer edges of said metal plate than to the vertical centerline.

2. The method of claim 1, comprising forming vertical rows of nubs parallel to the vertical centerline of the metal plate.

3. The method of claim 2, comprising disposing nubs that have a space between adjacent vertically aligned nubs of 0.5 to 3 nub diameters.

4. The method of claim 2, comprising forming nubs on the metal plate by building up welding material on the surface of the metal plate by spot welding.

5. The method of claim 4, comprising an automated welding process wherein nubs are spot welded in a shape between a flattened hemisphere and a low profile conical shape.

6. The method of claim 2, comprising manually handling the welding rod during the welding process.

7. The method of claim 2, comprising forming at least six nubs in an individual vertical line on the metal plate.

8. The method of claim 2, wherein said outer edges of said metal plate are substantially parallel to said vertical centerline.

9. The method of claim 8, comprising positioning lines of nubs on said metal plate such that the transverse distance from the nubs to the centerline is more than one-half the transverse distance from the centerline to the outer edge.

10. The method of claim 1, wherein said outer edges of said metal plate are substantially parallel to said vertical centerline.

11. The method of claim 10, comprising positioning lines of nubs on said metal plate such that the transverse distance from the nubs to the centerline is more than one-half the transverse distance from the centerline to the outer edge.

12. The method of claim 1, comprising positioning lines of nubs on said metal plate such that the transverse distance from the nubs to the centerline is more than one-half the transverse distance from the centerline to the outer edge.

* * * * *